United States Patent [19]
Zimmermann et al.

[11] Patent Number: 5,276,373
[45] Date of Patent: Jan. 4, 1994

[54] GAS-COOLED ELECTRIC MACHINE

[75] Inventors: Hans Zimmermann, Mönchaltorf; Sandor Pongracz, Kloten, both of Switzerland

[73] Assignee: Asea Brown Boveri Ltd., Baden, Switzerland

[21] Appl. No.: 966,343

[22] Filed: Oct. 26, 1992

[30] Foreign Application Priority Data

Nov. 25, 1991 [EP] European Pat. Off. ......... 91120019.4

[51] Int. Cl.[5] .............................................. H02K 9/00
[52] U.S. Cl. .......................................... 310/58; 310/56
[58] Field of Search ...................... 310/58, 56, 59, 61, 310/64, 60.4, 52

[56] References Cited

U.S. PATENT DOCUMENTS

| | | | |
|---|---|---|---|
| 3,969,643 | 7/1976 | Sapper | 310/53 |
| 4,286,183 | 8/1981 | Montgomery | 310/62 |
| 5,084,641 | 1/1992 | Saima et al. | 310/51 |

FOREIGN PATENT DOCUMENTS

| | | | |
|---|---|---|---|
| 0118802 | 9/1984 | European Pat. Off. | 310/58 |
| 1099064 | 8/1961 | Fed. Rep. of Germany | 310/58 |
| 1613102 | 9/1970 | Fed. Rep. of Germany | 310/58 |
| 2022933 | 12/1979 | United Kingdom | 310/58 |

OTHER PUBLICATIONS

Air-Cooled Turbogenerators 18 to 230 MVA Series WX and WY Publication No. CH-KW 1608 87 E Supersedes CH-T 070 084 E pp. 1-12.

*Primary Examiner*—Steven L. Stephan
*Assistant Examiner*—Matthew Nguyen
*Attorney, Agent, or Firm*—Oblon, Spivak, McClelland, Maier & Neustadt

[57] ABSTRACT

In gas-cooled electric machines having a stator (3) and a rotor (6) on which an axial ventilator (9) is arranged, the cooling gas flows unevenly into the end-winding cavity (13) seen in the circumferential direction. By providing upstream of the axial ventilator (9), when seen in the direction of flow of the cooling gas, and coaxially with said ventilator an annular air guide member (1) having baffles (17), and reducing the flow cross section for the cooling gas flowing through the air guide member (1) in the main direction of the approach flow on a part of the outer circumference of the air guide member (1) by means of a covering (23), the cooling effects becomes more even and the axial ventilator (9) is better utilized.

7 Claims, 2 Drawing Sheets

GAS-COOLED ELECTRIC MACHINE

BACKGROUND OF THE INVENTION

1. Field of the Invention

The invention relates to a gas-cooled electric machine; in this case, fresh gas is sucked in from below, passes into an inlet chamber and is conveyed by means of an axial ventilator into the end-winding cavity of the stator, where it splits up into a plurality of component streams for cooling the stator and rotor.

2. Discussion of Background

In gas-cooled turbogenerators, the cooling is ensured by axial ventilators which are normally mounted on both sides of the rotor on the shaft thereof and deliver the required quantity of cooling gas and a specific pressure head (cf. company publication "Turbogeneratoren für 18 . . . 230 MVA mit Luftkühlung WX und WY" ["Turbogenerators of 18 . . . 230 MVA having WX and WY air cooling"], Printed Publication No. CH-KW 160887, in particular the longitudinal section on page 9).

In the known air guides upstream and downstream of the axial ventilator, the prescribed sense of rotation of the rotor generates an inlet spin in the sense of rotation. The approach flow to the axial ventilator takes place as a rule only from one side, for example from below from the coolers arranged under the machine and not—as would be desirable—from all sides. These two circumstances mean that different air speeds prevail at the circumference in the end-winding cavity, as a result of which the cooling effect is uneven. This in turn means poor utilization of the machine.

SUMMARY OF THE INVENTION

Accordingly, one object of the invention is to provide a novel gas-cooled electric machine of the type mentioned at the beginning with improved cooling and thereby to enhance the utilization of the machine.

This object is achieved according to the invention by means of the features specified in claim 1.

The advantage of the invention is particularly to be seen in that as a result of these relatively simple structural measures, which can be realized both when designing the machine and even subsequently, the efficiency is increased, the air speeds in the end-winding cavity are equalized, and in the process the maximum temperatures of the winding are simultaneously depressed by approximately 15°-20° C.

Exemplary embodiments of the invention are explained below in more detail together with the advantages thereby achieved with the aid of the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
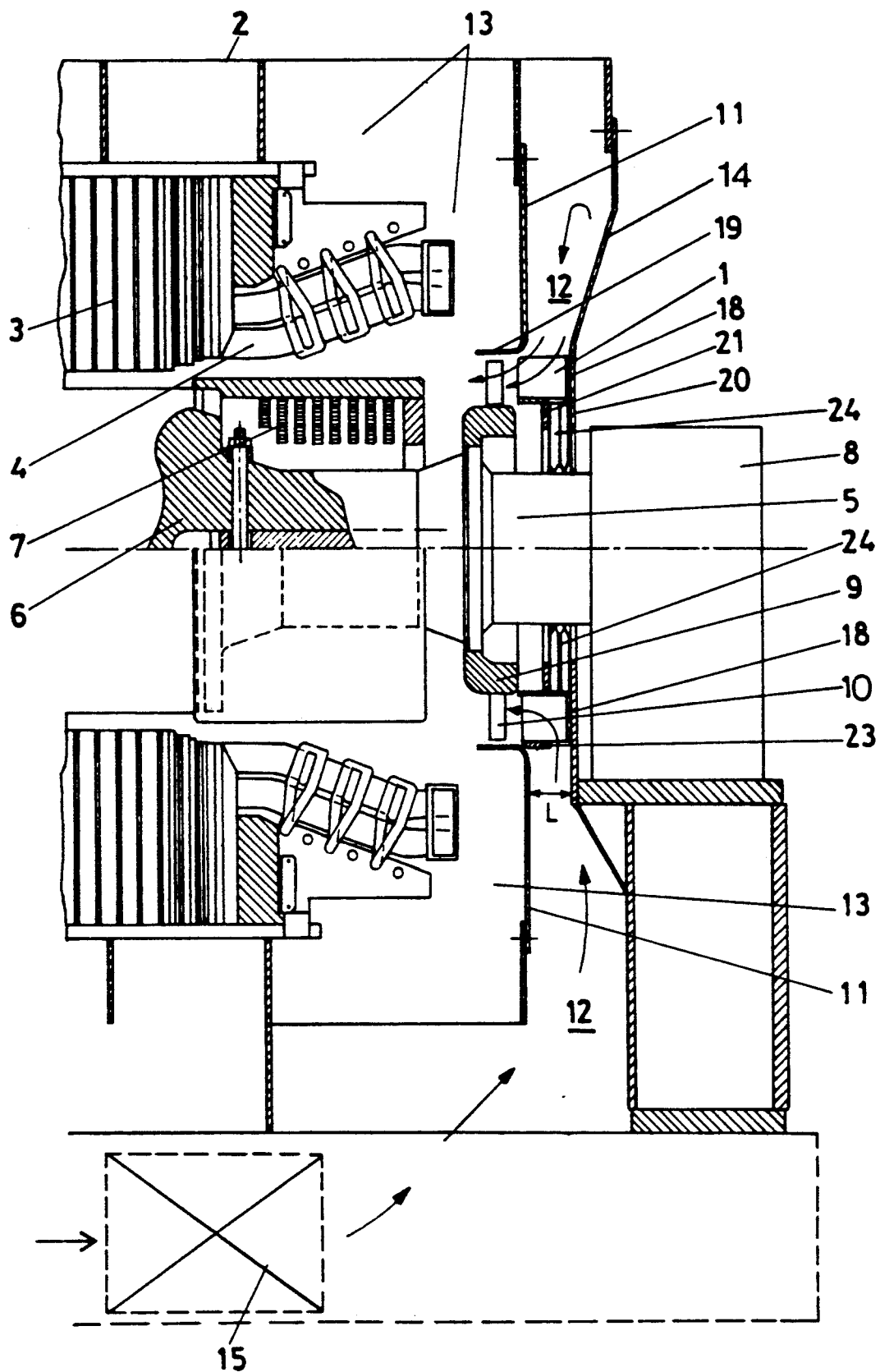
FIG. 1 shows a simplified longitudinal section through the end part of an air-cooled turbo-generator.

Referring now to the drawings, wherein like reference numerals designate identical or corresponding parts throughout the several views, in FIG. 1 it is the case that with the exception of the air guide member which is denoted overall by the reference numeral 1 the air-cooled turbogenerator corresponds to the machine as it is described and represented on page 9 of the company publication mentioned at the beginning. The stator laminated core 3 with stator winding 4 is arranged in a housing 2. The rotor shaft 5 of the rotor 6 with rotor winding 7 is supported in bearing blocks. An axial ventilator 9 with blades 10 is mounted on the shaft 5. A multipart end-winding cover 11 separates the inlet chamber 12 of the axial ventilator 9 from the end-winding cavity 13. The inlet chamber 12 is sealed outwards by means of an outer cover 14.

The cooling air conveyed by the axial ventilator 9 flows in the direction of the arrow into the end-winding cavity 13, is divided there into different component streams for cooling the rotor and stator. In the central section of the machine the heated air now enters the coolers 15 arranged under the machine, is cooled there and passes downstream of the coolers 15 back to the inlet chamber 12.

It is clear from FIG. 1 that the approach flow onto the axial ventilator 9 takes place essentially from only one side, specifically from below. Without the air guide member 1 according to the invention, the effects outlined at the beginning regarding uneven cooling of the end winding of the stator winding 4 are produced.

According to the invention, there is provided coaxially with the axial ventilator 9 an annular air guide member 1 which is mounted on the outer cover 14. It comprises an inner ring 16 on which there are mounted baffles 17 which are oriented radially outwards and take over the function of guide blades for the axial ventilator. These baffles 17 are distributed approximately evenly over the circumference of the inner ring 16. A cover ring 18 on the side averted from the axial ventilator 9 increases the stability of the air guide member. The radial height of the baffles 17 corresponds approximately to the length of the blades 10 of the axial ventilator 9. They extend in the axial direction virtually over the axial length L of the inlet chamber 12 at the radially inner end 19 of the end-winding cover 11. For the purpose of mounting on the radially inner end 20 of the outer cover 14, a ring flange 21 is mounted on the inside of the inner ring 16 by means of mounting bores 22 for screwing onto the outer cover 14. A shaft seal 24 is bolted onto the outer cover 14 together with the air guide member 1.

In order locally to reduce the approach flow cross section from the inlet chamber 12 to the axial ventilator 9 of the coolers 15 arranged under the machine, a partial covering 23 of the baffles 17 is provided in the lower region of the air guide member 1, that is to say the region closest to the coolers 15. Said covering extends in the circumferential direction over approximately a quarter of the circumference of the air guide member 1 in a manner that is symmetrical with respect to the vertical plane 25 of symmetry of the machine. Its axial extent amounts to approximately half the axial length of the baffles 17 and thus approximately half the inflow length L. The covering begins in this arrangement on the trailing edge of the baffles 17 that faces the axial ventilator 9.

The result of connecting an air guide member constructed in this way in the flow path of the cooling air directly upstream of the axial ventilator 9 is to achieve equalization of the approach flow to the axial ventilator 9, that is to say the cooling air throughput is approximately constant over the entire circumference of the baffles 17 thereof. Consequently, the cooling effect in the end winding is also equalized, so that the maximum temperatures occurring in the end-winding conductors is depressed by approximately 15° C. and the machine can therefore be utilized more intensely. The inlet spin is reduced by the radially/axially positioned baffles 17, which has a positive effect on the efficiency of the axial ventilator 9.

Figure 2:
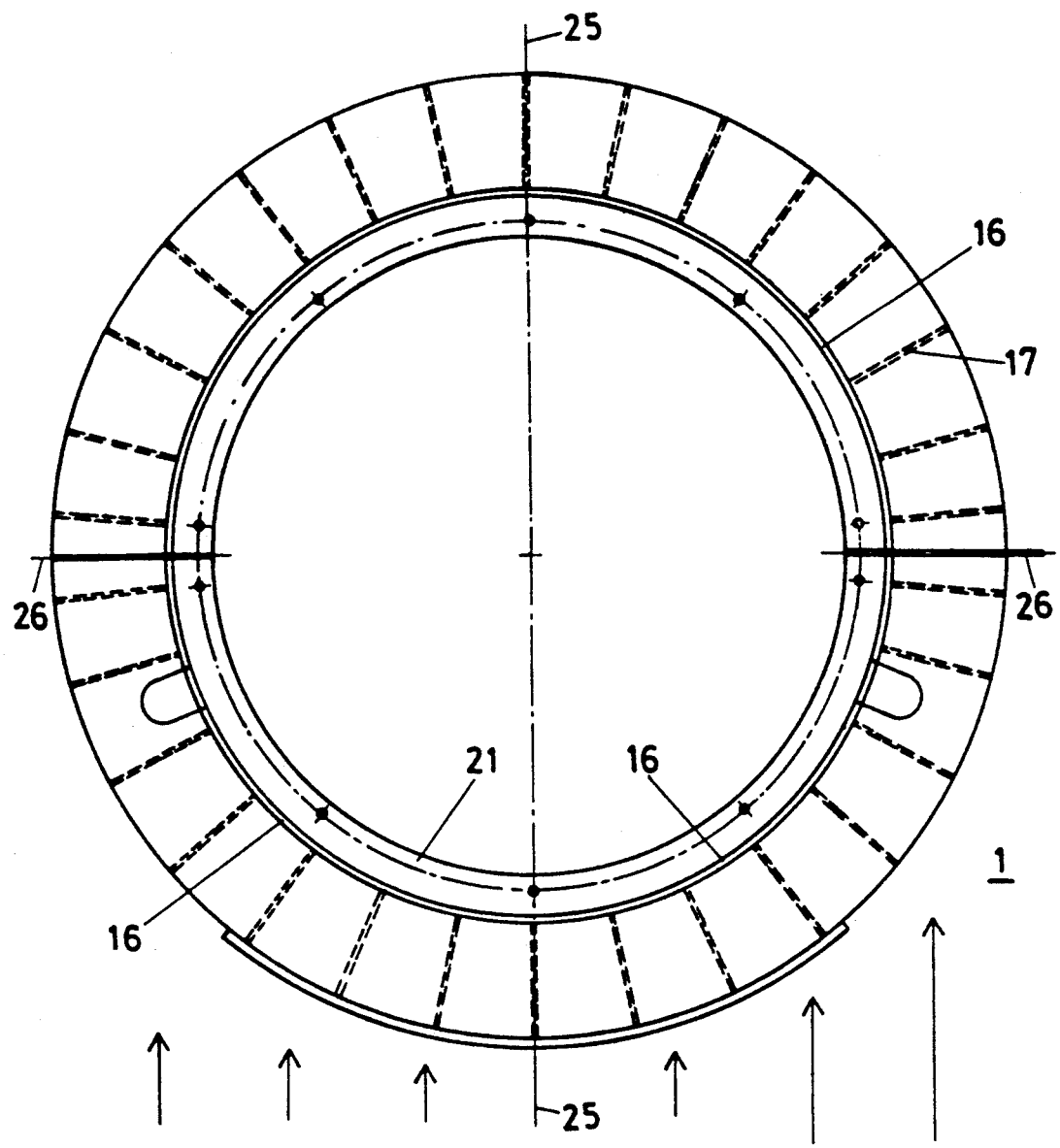
FIG. 2 shows a top view of the air guide member connected upstream of the axial ventilator before its installation in the machine.

As shown by a comparison of FIG. 1 with the illustration on page 9 of the company publication cited at the beginning, there is present between the bearing 8 and the axial ventilator 9 enough axial and radial space also to retrofit the proposed air guide member in existing machines, it being necessary at most to make modifications of the shaft seal 24. It is advantageous here both for such cases and for new designs to construct the air guide member 1 in two parts with a separation in the horizontal plane 26 of symmetry of the machine, as is illustrated in FIG. 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas-cooled electric machine having a stator and a rotor, on which an axial ventilator is arranged, an end-winding cavity into which cooling gas conveyed by the axial ventilator flows and splits up into a plurality of component streams for cooling the stator and rotor, an inlet chamber which is separated from the end-winding cavity by an end-winding cover and into which fresh gas flows from coolers, and an outer cover which separates the inlet chamber from the outside, wherein seen in the direction of flow of the cooling gas there is provided upstream of the axial ventilator and coaxially therewith an annular air guide member which is mounted on the outer cover and which is provided with baffles distributed over its entire circumference and extending both radially and axially, and there is provided on a part of an outer circumference of the annular air guide member a covering which in the main direction of the approach flow restricts the flow cross section for the cooling gas flowing through the air guide member.

2. The machine as claimed in claim 1, wherein the air guide comprises an inner ring having baffles which are oriented radially outwards and aligned essentially axially.

3. The machine as claimed in claim 2, wherein a ring flange is provided on the inside of the inner ring for the purpose of mounting the air guide member on the outer cover.

4. The machine as claimed in one of claims 1 to 3, wherein the baffles have an axial length which corresponds approximately to the axial width of the inlet chamber at the level of the axial ventilator.

5. The machine as claimed in claim 4, wherein the axial length of the covering corresponds approximately to the axial width of the inlet chamber at the level of the axial ventilator, this covering beginning on the trailing edge of the baffles that face the axial ventilator.

6. The machine as claimed in claim 1, wherein the covering extends symmetrically with respect to a vertical axis of symmetry of the machine and over approximately a quarter of the circumference of the air guide member.

7. A gas-cooled electric machine having a stator and a rotor, on which an axial ventilator is arranged, an end-winding cavity into which cooling gas conveyed by the axial ventilator flows and splits up into a plurality of component streams for cooling the stator and rotor, an inlet chamber which is separated from the end-winding cavity by an end-winding cover and into which fresh gas flows from coolers, and an outer cover which separates the inlet chamber from the outside, wherein with respect to a direction of flow of cooling gas there is provided upstream of the axial ventilator and coaxially therewith an annular air guide member including a plurality of baffles distributed circumferentially about the annular air guide member, said baffles extending both radially and axially, and wherein a covering is provided on a portion of an outer circumferences of said annular air guide member radially outside of said baffles, such that said covering restricts a flow cross section of cooling gas along said portion.

* * * * *